United States Patent Office 2,977,345
Patented Mar. 28, 1961

2,977,345

ACCELERATOR SYSTEM FOR STEAM CURING POLYMERS

Wilbur Frank Fischer, Cranford, Robert Frederick Neu, Westfield, and Robert L. Zapp, Florham Park, N.J., assignors to Esso Research and Engineering Company, a corporation of Delaware No Drawing. Filed Jan. 2, 1958, Ser. No. 706,554

4 Claims. (Cl. 260—79.5)

The present invention relates to curing hydrocarbon polymers in the presence of a combination of accelerators. More specifically, it relates to curing isoolefin-multiolefin polymers in an atmosphere containing moisture by using a combination of dithiocarbamates and thiazoles. Moreover, it concerns the improved vulcanizates obtained by this process.

Earlier natural rubber was cured in the presence of steam by using sulfur as the curing agent. More recently it has been noted that both natural and synthetic rubbers can be more rapidly and thoroughly cured by employing sulfur and accelerators. One of the most effective classes of accelerators are the dithiocarbamates, especially those types containing high hydrocarbon substituents such as tellurium ethyl benzyl dithiocarbamate. These substances are especially important in the case of butyl rubber which would otherwise have a surface with a low state of cure. The higher substituted dithiocarbamates are more effective because they are less water sensitive than say the diethyl derivative. However, because these compounds are costly it is generally advisable to use as little as possible of these higher molecular weight derivatives in compounding the rubber.

It has now been found that certain other accelerators, when combined with the higher substituent dithiocarbamates, produce extraordinary vulcanizates. The most thiazoles. These substances when used in combination with the dithiocarbamates produce an unexpected synergistic effect.

While the present invention may be applied to natural rubber or synthetic rubbers, it has been found to be especially effective in butyl rubber. The high unsaturation rubbery polymers do not show the improvement observed with butyl rubber because at most normal states of cure these rubbers have a large excess of unreacted double bond sites. Therefore small changes in the state of vulcanization or cross linking at the surface do not alter for example, the ozone resistance.

The expression "butyl rubber" as employed in the specification and claims is intended to include copolymers having about 90–99.5% by weight of an isoolefin which has about 4–7 carbon atoms, and about 10–0.5% by weight of a conjugated multiolefin having about 4–14 carbon atoms. The term "butyl rubber" is described in an article by R. M. Thomas et al. in Industrial Engineering and Chemistry, vol. 32, pages 1283 et seq., October 1940.

In preparing butyl rubber polymer, the isoolefin and mutiolefin are mixed in the ratio of a major proportion of the multiolefin, the preferred range being about 70 to 99.5, preferably 85 to 99.5 parts by weight of the isoolefin to about 30 to 0.5, preferably 0.5 to 15 parts by weight of the multiolefin. High purity is desirable in both materials, it being preferable to use an isoolefin of at least 98% purity, although satisfactory copolymers may be made from multiolefins of a lower purity.

In general, the rubber comprises the reaction product of a $C_4$ to $C_7$ isoolefin, such as isobutylene or 2-methyl-1-butene, with a $C_4$ to $C_{10}$ conjugated diolefin, such as isoprene, butadiene or piperylene. The reaction product product of isobutylene and isoprene is preferred. For instance, 97 to 97.5% by weight of isobutylene is reacted with 2.5 to 3.4% by weight of isoprene.

The mixture of monomers is cooled to a temperature within the range between about 0° and —200° C., preferably between about —40° and —160° C. It is especially preferred that the reaction temperature be between —60° C. and —130° C. The materials may be cooled by the use of a refrigerating jacket, which surrounds the mixing tank, for instance using liquefied ethylene as cooling liquid. Alternatively, the mixture may be cooled by means of an internal refrigerant. In this case, it is mixed directly with the starting materials. Refrigerants which have been found to be satisfactory for internal use are liquid propane, solid carbon dioxide, liquid ethane, liquid ethylene, etc.

The cold mixture is polymerized by the addition of a Friedel-Crafts catalyst, preferably an aluminum halide catalyst in a liquid or dissolved form, with vigorous agitation. The amount of catalyst employed is generally about 0.15% to about 1.0% by weight of the mixed olefins. The liquid catalyst may be sprayed on to the surface of the rapidly stirred mixture, or it may be introduced in the form of a pressured stream.

The polymerization reaction proceeds rapidly. The polymer precipitates out of solution in the form of a slurry of flocculent white solid. When the polymerization has reached the desired stage, the material is conveniently recovered by charging the whole mixture into warm water which may contain alcohol, ether, aldehyde or organic acid to inactivate the catalyst. The polymer is then recovered from the water suspension in any convenient manner, such as straining or filtering. It is then dried either by passing it through a tunnel drier, or on a mill. The product has plastic and elastic properties.

The polymer has a Staudinger molecular weight between approximately 20,000 to 150,000. It is desired that the molecular weight fall between about 35,000 and 100,000 and it is preferred that it be in the range between 45,000 and 60,000. The material has a Wijs iodine number between about 0.5 and 50, generally between about 1 and 15. The preparation of the above rubbery butyl copolymer is described in U.S. Patent No. 2,356,128 to which reference may be had for further details.

According to the present invention butyl rubber is cured in open steam at a temperature between about 200° C. and 120° C. for from about 20 seconds up to 3 hours in the presence of sulfur or a sulfur-containing curing agent, a thiazole and a dithiocarbamate in which at least one of the two hydrocarbon groups that are attached to it contains 4 to 10 or 14 carbon atoms, while the other hydrocarbon group may contain from 2 to 10 carbon atoms. A preferred embodiment of the invention is where at least one or both of the hydrocarbon groups in the dithiocarbamate is cyclic and contains 6 to 10 carbon atoms, for instance, aryl, alkaryl, cyclo paraffinic, alkyl, aryl and diaryl derivatives. It has been noted that these latter accelerators in combination with the thiazoles produce vulcanizates that are exceptionally resistant to ozone oxidation.

The dithiocarbamate accelerators coming within the purview of the invention have the following general formula:

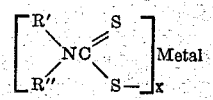

wherein R' is an alkyl, aryl, cycloparaffinic, or alkaryl group containing 4 to 10 carbon atoms; R" is an alkyl, aryl, cycloparaffinic or alkaryl group containing 2 to 10 carbon atoms; the metal is tellurium, copper, zinc, lead, iron, calcium, strontium, potassium or sodium; $x$ is the valence of the metal and is generally between 1 and 4, although it is usually better to use metals having a valence of 2 to 4. Group I-B and VI-A metals in the periodic table, especially tellurium and copper, are preferred because they bring about a faster cure. The preferred hydrocarbon groups are butyl, pentyl, hexyl, octyl, nonyl, decyl, cyclohexyl, benzyl and combinations thereof with themselves or lower hydrocarbon groups such as ethyl and propyl.

The coaccelerator may be a thiazole or preferably an aryl thiazole having a sulfur attached to the thiazole ring or nucleus. It may have the following general formula:

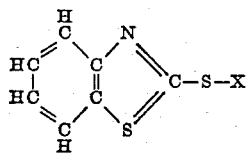

wherein X is hydrogen, an -SH, a cyclic amine, aryl, alkyl, alkylaryl or a metal such as zinc, tellurium, cadmium, copper, etc. Among the arylthiazole sulfides coming within the purview of the invention are: N-cyclohexyl, 2-benzothiazole sulfenamide, mercapto benzothiazole, benzothiazyl disulfide, zinc benzothiazyl sulfide, benzothiazyl thiobenzoate, (NOBS special), N-oxydiethylene benzothiazole-2-sulfonamide.

The curing agent should be sulfur or a sulfur-liberating substance such as morpholine disulfide, or thiuram tetrasulfide. Generally between about 1 and 10 parts by weight of the sulfur-liberating compounds and a minor amount of the dithiocarbamate and thiazole accelerators, say about 0.5 to 10 parts by weight, in a ratio of 1:1 to 1:3 parts by weight to one another are mixed with 100 parts by weight of butyl rubber and cured in the presence of open steam for from about 15 to 100 minutes. For most purposes about 1 to 5 parts by weight of the combined accelerators are sufficient to improve the vulcanizate. It is generally desirable to also have about 3 to 10 parts by weight of a divalent metal oxide, such as zinc oxide, present during the curing operation.

The compounded butyl rubber is usually extruded at a temperature between 100 and 200° C. and cured in position. That is to say, a wire coated with a film, say, about 1/64" to ½ inch thick may be passed through a steam chamber at such a rate that the compounded butyl rubber film is cured by the time it leaves the chamber. A second method consists of taking the extruded or preformed articles and statically vulcanizing the article in a steam autoclave. One of the advantages of the present invention is that the rubber is thoroughly cured and has little or no surface tack such as is frequently connected with this type of cure. It has also been noted that the accelerators of the present invention form a more homogeneous mixture with the butyl rubber and it is believed that this at least partially accounts for the improved vulcanizate which is obtained.

The ozone resistant butyl rubbers may be blended and cured with a higher unsaturation rubber using special curing systems such as an amine, e.g. diortho tolyl guanidine, and sulfur. For instance about 1 to 50 parts of GR-S or natural rubber may be blended with 100 parts of butyl rubber and 1 to 4 parts of the accelerators. Other conventional compounding materials may also be used, such as fillers, oil extenders, softeners, stabilizers, etc.

The following examples are given to more fully illustrate the various embodiments of the present invention. All recipes are in parts by weight.

EXAMPLE 1

Isobutylene-isoprene butyl rubber (formerly known as GR-1-18), was compounded in a Banbury according to the following formula:

| Ingredients: | Parts |
|---|---|
| Butyl | 100 |
| HMF black | 30 |
| SRF black | 80 |
| Zinc oxide | 5 |
| Naphthenic oil (Nection 60) | 10 |

The sulfur (1.5 part) and accelerators were added on a cold laboratory mill in the conventional manner. An extruded strip of each sample was steam cured for 30 minutes at 320° F. The vulcanizates were cut into dumbbells 0.075 inch thick (ASTM-D-412-51T) having ½ inch wide shoulders, stretched 50% and allowed to stand for 30 minutes before being put in an atmosphere containing 50 pphm of ozone in air at 38° C.

| Run # | Accelerators(s) | phr.[1] | Ozone Observations | | | Water Absorption, Percent |
|---|---|---|---|---|---|---|
| | | | 3 hrs. | 19 hrs. | 27 hrs. | |
| 1 | Tellurium diethyl dithiocarbamate | 2 | 0+ | 2 | 2 | 1.95 |
| 2 | Tellurium ethyl benzyl dithiocarbamate | 2.8 | 0 | 0+ | 1 | 1.60 |
| 3 | TEBD[2] / Benzothiazyl disulfide | 1.5 / 1.3 | 0 | 0 | 0 | 1.43 |
| 4 | Benzothiazylidisulfide | 2.8 | | | | |
| 5 | TEBD / Mercaptobenzothiazole | 1.3 / 1.3 | 0 | 0+ | 1 | 1.61 |
| 6 | Mercaptobenzothiazole | 2.6 | | | | |
| 7 | TEBD / 97 Zinc benzothiazyl sulfide / 3% Tetramethyl thiuram disulfide | 1.5 / 1.3 | 0 | 0+ | 0+ | 1.45 |

[1] Phr. = parts per hundred parts of (butyl) rubber.
[2] TEBD = Tellurium ethyl benzyl dithiocarbamate.

The percent water absorption was determined at 85° C. based on the gain in weight of a strip (0.070" x 0.75" x 4"). Low water absorption values are desired since they indicate decreased water sensitivity of the curatives during curing, for example, TEBD and benzothiazyl disulfide, which results in better surface cure and superior ozone resistance.

The ozone ratings may be defined as follows:

0 = no cracks visible under 7 X magnification
0+ = slight cracks visible under 7 X magnification
1 = cracks visible to naked eye
2 = large cracks The data show that combinations of dithiocarbamate and arylthiazole compounds are superior to dithiocarbamates alone. This is seen comparing runs 2 and 3. The latter was outstandingly better than the former in both water absorption and ozone resistance properties. The thiazole cooperates with the higher hydrocarbon substituent-containing dithiocarbamate to produce a synergistic result.

EXAMPLE 2

Another series of tests was made in which were evaluated butyl rubber, accelerator concentration effects of tellurium ethyl benzyl dithiocarbamate (EBT) and benzothiazyl disulfide (Altax) alone and in combination with each other. The following compounding formulation was used.

| Ingredients: | Parts |
|---|---|
| Butyl rubber [1] | 100 |
| Carbon black (Philblack A) | 30 |
| Sterling R (SRF carbon black) | 80 |
| Zinc Oxide | 5 |
| Spider sulfur | 1.5 |
| Plasticizer oil (Necton 60) | 10 |
| Accelerators | ([2]) |

[1] Having an unsaturation of about 0.6 to 1.0 mole percent, and a Mooney viscosity of about 38 to 47.
[2] As indicated below.

The amounts of accelerators used and the data obtained on physical properties and ozone resistance are shown in the following table.

*Effect of ethyl benzyl Tellurac [a]-Altax concentration on properties of butyl rubber vulcanizates*

| Run # | Accelerators | | | Steam Cured 30'/320° F. | | | | |
|---|---|---|---|---|---|---|---|---|
| | phr. | | parts altax per part EBT | Tens., p.s.i. | Mod., p.s.i., 200% | Percent Elong. | Ozone Observations [b] | |
| | EBT | Altax | | | | | 27 hrs. | Relative Rating |
| 8 | 0.8 | | | 1,510 | 1,030 | 400 | broke 4 | 8 |
| 9 | 1.3 | | | 1,490 | 1,130 | 350 | do | 7 |
| 10 | 1.8 | | | 1,485 | 1,215 | 350 | large cracks 3 | 6 |
| 11 | 2.8 | | | 1,295 | 985 | 370 | large cracks 2-4 | 5 |
| 12 | | 1.3 | | 1,345 | 785 | 470 | broke 4 | 9 |
| 13 | | 1.8 | | 1,305 | 740 | 500 | do | 9 |
| 14 | | 2.8 | | 1,265 | 675 | 520 | do | 9 |
| 15 | 0.8 | 2.0 | 2.5 | 1,370 | 1,035 | 375 | med. cracks 1+ | 4 |
| 16 | 1.3 | 1.5 | 1.2 | 1,350 | 1,080 | 330 | Sl. cracks 1 | 2 |
| 17 | 1.5 | 1.3 | 0.9 | 1,345 | 1,175 | 300 | no cracks 0 | 1 |
| 18 | 2.0 | 0.8 | 0.4 | 1,410 | 1,165 | 300 | med. cracks 1+ | 3 |

[a] Tellurium ethyl benzyl dithiocarbamate. Altax=benzothiazyl disulfide.
[b] 50 phm. ozone, 50% dumbbell extension.

Physical properties and particularly ozone data obtained on steam cured vulcanizates show a distinct advantage for a combination of about 1.5 phr. of EBT and 1.3 phr. of Altax as compared to the performance level of 2.8 phr. of either accelerator alone. Straight Altax is very difficient on original physicals and ozone resistance while EBT alone is slightly poorer on physicals and definitely poorer on ozone resistance. From a practical use viewpoint, the combination of accelerator shows an advantage is cost compounding and should considerably improve the useful life of the butyl rubber vulcanizate.

Thus, generally, according to the present invention it is desirable to use about 0.3 to 2.5 parts of the thiazole per part of the dithiocarbamate. More specifically, for instance, it is desirable to use about 0.4 to 1.5, preferably 0.6 to 1.2, and best about 0.8 to 0.9, parts of Altax per part of EBT.

Resort may be had to various modifications and variations of the present invention without departing from the spirit of the discovery or the scope of the appended claims.

What is claimed is:

1. A composition of matter having good ozone resistance comprising, 100 parts by weight of a butyl rubber copolymer of 85 to 99.5 wt. percent of a $C_4$ to $C_7$ isoolefin and 0.5 to 15 wt. percent of a $C_4$ to $C_{10}$ multiolefin, cured with sulfur in the presence of about 0.5 to 10 parts by weight of a combination of accelerators, said combination of accelerators consisting essentially of tellurium ethyl benzyl dithiocarbamate and benzothiazyl disulfide, said combination of accelerators containing about 0.3 to 2.5 parts by weight of benzothiazyl disulfide per part by weight of tellurium ethyl benzyl dithiocarbamate.

2. A composition according to claim 1 comprising 0.6 to 1.2 parts by weight of benzothiazyl disulfide per part by weight of tellurium ethyl benzyl dithiocarbamate.

3. A composition of matter comprising 100 parts by weight of a butyl rubber copolymer of 85 to 99.5 wt. percent of a $C_4$ to $C_7$ isoolefin and 0.5 to 15 wt. percent of a $C_4$ to $C_{10}$ multiolefin, cured with sulfur in the presence of about 0.5 to 10 parts by weight of an accelerator combination, said accelerator combination consisting of tellurium ethyl benzyl dithiocarbamate and benzothiazyl disulfide, and wherein said accelerator combination contains 0.3 to 2.5 parts by weight of benzothiazyl disulfide per part by weight of tellurium ethyl benzyl dithiocarbamate.

4. A process for curing a butyl rubber copolymer of 85 to 99.5 wt. percent of a $C_4$ to $C_7$ isoolefin and 15 to 0.5 wt. percent of a $C_4$ to $C_{10}$ multiolefin, which comprises, mixing said butyl rubber copolymer with a curing agent, and 0.5 to 10 wt. percent based on copolymer of a combination of accelerators, said combination of accelerators consisting essentially of tellurium ethyl benzyl dithiocarbamate and benzothiazyl disulfide, about 0.3 to 2.5 parts by weight of benzothiazyl disulfide being employed per part by weight of tellurium ethyl benzyl dithiocarbamate, and curing said mixture with steam at 120 to 200° C.

References Cited in the file of this patent

UNITED STATES PATENTS

| 2,457,331 | Trepagnier | Dec. 28, 1948 |
| 2,871,211 | Mika | Jan. 27, 1959 |

FOREIGN PATENTS

| 587,830 | Great Britain | May 7, 1947 |

OTHER REFERENCES

Vanderbilt Rubber Handbook, 1948, R. T. Vanderbilt Co., page 80 and page 50, paragraph 2.